US011307114B2

(12) United States Patent
West (10) Patent No.: US 11,307,114 B2
(45) Date of Patent: Apr. 19, 2022

(54) PRESSURE-BASED FLAW DETECTION

(71) Applicant: NATIONAL OILWELL VARCO, L.P., Houston, TX (US)

(72) Inventor: Neil West, Norco, CA (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 171 days.

(21) Appl. No.: 16/543,122

(22) Filed: Aug. 16, 2019

(65) Prior Publication Data

US 2020/0191678 A1 Jun. 18, 2020

Related U.S. Application Data

(60) Provisional application No. 62/780,492, filed on Dec. 17, 2018.

(51) Int. Cl.
*G01M 3/32* (2006.01)
*G01L 27/00* (2006.01)
(Continued)

(52) U.S. Cl.
CPC .......... *G01M 3/3272* (2013.01); *E21B 47/07* (2020.05); *G01L 27/007* (2013.01); *G01M 3/28* (2013.01);
(Continued)

(58) Field of Classification Search
CPC ............. G01M 3/3272; G01M 3/2853; G01M 3/2884; G01M 3/28; G01M 3/02; G01M 3/26; E21B 47/06; E21B 49/008
See application file for complete search history.

(56) References Cited

U.S. PATENT DOCUMENTS 3,832,889 A 9/1974 Bauer
4,104,906 A * 8/1978 Oertle ...................... G01L 1/22
116/70
(Continued)

FOREIGN PATENT DOCUMENTS

EP 2177887 A2 4/2010
EP 2592408 A1 5/2013
(Continued)

OTHER PUBLICATIONS

"International Application Serial No. PCT/US2019/065029, International Search Report dated Mar. 18, 2020", 3 pgs.
(Continued)

*Primary Examiner* — Benjamin R Schmitt
(74) *Attorney, Agent, or Firm* — Schwegman Lundberg & Woessner, P.A.

(57) ABSTRACT

A flaw detection system may include a dedicated monitor volume within a structural component of a system. The monitor volume may establish an air tight space bounded by at least one joint where the joint establishes a portion of a boundary of the air tight space and is in fluid communication with the air tight space. The system may also include a pressure sensing device configured for sensing the pressure in the dedicated monitor volume. A method of monitoring a system for flaw development may include monitoring a pressure sensor configured to sense the pressure in a dedicated monitor volume of a structural component of a system. The method may also include inspecting the structural component to identify a flaw location when the pressure sensor identifies a change in pressure in the dedicated monitor volume.

9 Claims, 10 Drawing Sheets

(51) Int. Cl.
*E21B 47/07* (2012.01)
*G01M 3/28* (2006.01)
*E21B 49/00* (2006.01)
*G01M 3/02* (2006.01)
*E21B 47/06* (2012.01)

(52) U.S. Cl.
CPC ........ G01M 3/2853 (2013.01); G01M 3/2884 (2013.01); *E21B 47/06* (2013.01); *E21B 49/008* (2013.01); *G01M 3/02* (2013.01)

(56) References Cited

U.S. PATENT DOCUMENTS

| | | | |
|---|---|---|---|
| 4,425,054 A * | 1/1984 | Blondy | G01M 3/02 |
| | | | 405/211 |
| 4,513,605 A | 4/1985 | Hawerkamp | |
| 4,596,135 A | 6/1986 | Wardlaw, III | |
| 5,219,115 A | 6/1993 | Conley et al. | |
| 7,628,532 B2 | 12/2009 | Wardlaw | |
| 9,594,001 B2 | 3/2017 | Wakayama | |
| 9,905,817 B2 | 2/2018 | Nose et al. | |
| 2002/0176617 A1 | 11/2002 | Simonetti | |
| 2005/0109082 A1 * | 5/2005 | Stewart | G01M 3/26 |
| | | | 73/40 |
| 2006/0000261 A1 | 1/2006 | Wardlaw | |
| 2006/0202381 A1 | 9/2006 | Bach et al. | |
| 2010/0095748 A1 * | 4/2010 | Kim | G01M 3/04 |
| | | | 73/49.3 |
| 2018/0149622 A1 | 5/2018 | Vieau et al. | |

FOREIGN PATENT DOCUMENTS

| | | |
|---|---|---|
| JP | H2310440 A | 12/1990 |
| JP | 2016176857 A | 10/2016 |
| WO | WO-2011044611 A1 | 4/2011 |
| WO | WO-2011089319 A1 | 7/2011 |
| WO | WO-2013129411 A1 | 9/2013 |
| WO | 2020131436 | 6/2020 |

OTHER PUBLICATIONS

"International Application Serial No. PCT/US2019/065029, Written Opinion dated Mar. 18, 2020", 6 pgs.

"International Application Serial No. PCT US2019 065029, International Preliminary Report on Patentability dated Jul. 1, 2021", 8 pgs.

* cited by examiner

PRESSURE-BASED FLAW DETECTION

CROSSED-REFERENCE TO RELATED APPLICATION

This patent application claims the benefit of U.S. Provisional Patent Application No. 62/780,492, filed Dec. 17, 2018, which is incorporated by reference herein in its entirety.

TECHNOLOGICAL FIELD

The present disclosure relates to structural flaws in oil rigs, in equipment, machines, or structures, and/or in other systems. More particularly, the present disclosure relates to inspection, monitoring, and/or techniques for identifying the structural flaws. Still more particularly, the present disclosure relates to actively monitoring systems for structural flaws during and without interrupting use and/or operation. Still more particularly, the present disclosure relates to actively monitoring for structural flaws during use and using a pressure differential.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Flaws in oil rigs, in equipment, machines, or structures and/or in other systems may develop over time due to a variety of circumstances. For example, these systems or portions thereof may be subjected to loading, weather, corrosive environments, renovation such as cleaning/repainting, and other situations throughout their lifetime. These situations may cause the system or portion of the system to weaken due to fatigue, for example. These situations may also cause the system or portion of the system to wear such as by loss of material. Fatigue or loss of material can often lead to cracks, tears, porosity, or other flaws or defects in the systems. These flaws or defects can lead to system failures such as structural failures, performance failures, and the like. In some circumstances, these failures can be dangerous due to moving equipment, falling equipment or structures, loss of control, or other dangerous situations.

In some environments, inspections are regulated and help to ensure monitoring for flaws or defects. In some cases, for example, visual inspections may be performed on a periodic basis. In some cases, x-ray scanning, ultrasonic scanning or other non-destructive testing (NDT) methods may be used to assess a system for structural flaws. These types of inspections, the level of those inspections, and the timing of those inspections may be determined by particular regulating authorities. For example, in the oil industry, the American Petroleum Institute (API) may establish regulations for inspecting oil drill rigs, for example. In the case of bridges, the National Transportation Safety Board (NTSB) may establish regulations for inspection. However, such regulations commonly require periodic testing, which may not allow for flaw detection between testing and may also cause inspection times that are inconvenient and/or interrupt operations.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a flaw detection system may include a monitor volume within a structural component of a system. The monitor volume may establish an air tight space bounded by at least one joint where the joint establishes a portion of a boundary of the air tight space and is in fluid communication with the air tight space. The system may also include a pressure sensing device configured for sensing the pressure in the monitor volume.

In one or more other embodiments, a method of monitoring a system for flaw development may include monitoring a pressure sensor configured to sense the pressure in a monitor volume of a structural component of a system. The method may also include inspecting the structural component to identify a flaw location when the pressure sensor identifies a change in pressure in the monitor volume.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to an in use pressure-based flaw detection system. The system may be provided on and/or integrated into structures, equipment, machines, or other systems that may develop flaws, such as cracks for example, over time and/or throughout use. The system may allow for active monitoring of the structural integrity of the structure during use and/or operation. More particularly, the system may be constructed with hollow elements that, when connected and assembled, create contained volumes. These volumes may be pressurized or a vacuum may be created therein such that the internal pressure of the volume differs from atmospheric pressure. Where a crack or flaw develops in the hollow elements or, more likely, in a joint such as a connection or weld between the several hollow elements, the internal pressure of the monitored volume may partially or completely equalize with the surrounding pressure due to the entry or exit of gas into or from a monitored volume. When the pressure equalizes or changes, this may be evidence that a crack or flaw has developed and inspections of the system may be conducted or scheduled accordingly. Connected members may include fluid communication features to fluidly connect several volumes. For a given system, multiple control volumes may be created and linked to one another with hoses, for example, to reduce the number of pressure gauges or sensors being used.

Figure 1:
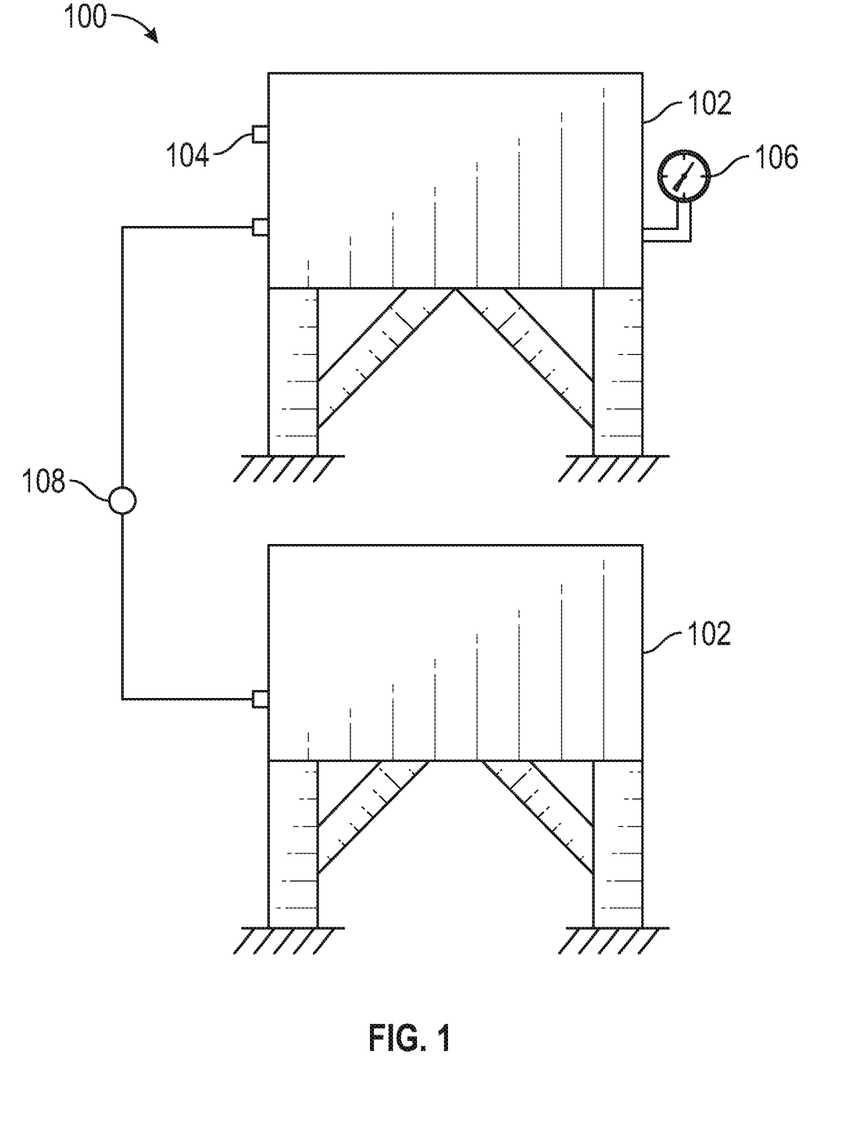
FIG. 1 is a schematic view of a pressure-based flaw detection system, according to one or more embodiments.

Referring now to FIG. 1, a schematic diagram of a pressure-based flaw detection system 100 is shown. The system may be configured for monitoring for the development of structural flaws throughout the life of and/or during use of a device, structure, or machine by maintaining and monitoring a pressure differential and indicating when the pressure differential changes by a selected amount and/or is reduced from an initial pressure differential. The system may include one or more monitor volumes 102, a pressure control port 104, and a pressure indicating device 106. In one or more embodiments, the system may include multiple volumes 102 and the multiple volumes may be in fluid communication with one another directly or via a linking conduit 108.

The monitor volume 102 may include any contained space that is capable of being made air tight. For example, several structures, parts of devices, or parts of machines may be constructed of rectangular or round tubes or pipes. When end caps are placed on the tubes or pipes, a volume or space may be created and if the caps are seal welded, bolted with gaskets, or otherwise sealed against the ends of the tube or pipe, the volume or space within the tube may be air tight. Similarly, monitor volumes 102 may be created using plates, angles, or other structural shapes and are not limited to tubes or pipes. In one or more embodiments, a monitor volume 102 may be part of a weldment or other built up assembly including bolted assemblies that may include one or more monitor volumes 102. As discussed in more detail below, the one or more monitor volumes 102 may be isolated from one another or in fluid communication with one another forming a series of connected monitor volumes 102.

It is to be appreciated that the monitor volume or volumes 102 may or may not play a role in the functionality of the weldment or other built up assembly and, instead, may exist for the very purpose of monitoring the structural integrity of the system. That is, for example, a piping system having welded flanges that function to connect pipes or sections to one another and they may also function to contain fluid being pumped or otherwise transported through the pipe. In contrast, the present system may include monitor volumes that are unrelated to the operation of the weldment, assembly, or device, and, instead, may be present particularly for monitoring purposes. That is, the monitor volumes may be dedicated to monitoring for structural integrity of the system. In this manner, the monitor volumes may be auxiliary or dedicated volumes, for example, that do not function to process fluid or maintain a pressurized fluid other than for the purpose of monitoring the surrounding welds or joints. That is, the containment of the pressure differential may be for purposes of monitoring the joints only and not because the fluid is particularly valuable to contain or dangerous if released, for example. While some of the joints surrounding a monitor volume may be included to maintain a pressure differential, at least one joint for any given monitor volume may have a primary purpose of performing structurally for the machine, device, implement, or other system and not a primary purpose of maintaining a pressure differential.

The pressure control port 104 may be configured for allowing the fluid within the monitor volume 102 to be controlled. The port 104 may allow the monitor volume to be pressurized, for example. Alternatively, the port may allow the gas or fluid within the monitor volume to be evacuated or reduced to create a lower pressure in the monitor volume than the surrounding atmosphere. In still other embodiments, the pressure control port may allow particular fluids or gases to be injected into the monitor volume. For example, helium or other detectable gases may be injected into the monitor volume to assist with identifying the location of a flaw. The port may include a valve stem or other pressure control device that may allow for pressure changes within the monitor volume and maintaining the pressure within the monitor volume. In one or more embodiments, the port may be adapted for control of pressure when the internal pressure is either negative or positive pressure. In other embodiments, a port specific to the anticipated pressure (i.e., positive or negative) may be used.

The pressure indicating device 106 may include a pressure gauge, a pressure sensor or some other pressure sensing element that is capable of sensing pressure, negative pressure and/or a pressure differential. The pressure indicating device 106 may allow the development of a flaw to be recognized when the pressure in the monitor volume changes. The pressure sensor may be fully within the monitor volume or it may be on the boundary of the monitor volume. In one or more embodiments, the pressure indicating device may be a pressure gauge threaded into a tapped hole in the monitor volume, for example. Alternatively or additionally, the pressure indicating device 106 may be electro mechanical and may be adapted to send signals to a monitoring computer indicating the sensed pressure, the sensed differential pressure, and/or whether the pressure has changed or is changing, for example.

In use, the monitor volume 102 may be configured (e.g., designed, located, arranged and/or selected) for use in monitoring the structural integrity of one or more of the surrounding joints. For example, at least one joint that has a primary structural purpose (e.g., not a primary purpose of maintaining a pressure differential in the monitor volume) may be in fluid communication with the monitor volume 102. The monitor volume 102 may be pressurized or a vacuum may be created within the volume and if the joint develops a flaw, the pressure or vacuum within the volume may equalize, completely or partially, with the surrounding atmosphere suggesting that a flaw has developed. It is to be appreciated that particularly creative designs may be provided that allow for large numbers of joints to be monitored by the monitor volume. That is, because the goal is not focused on containing pressurized fluid for the fluid's sake, efficient uses of material relative to contained volumes of fluid may not be as much of a consideration. Rather, the structural design of a system may be a primary focus and monitor volumes 102 may be built into the system to allow for in situ monitoring of weld joints or other joints whose primary purpose is structural.

Figure 2:
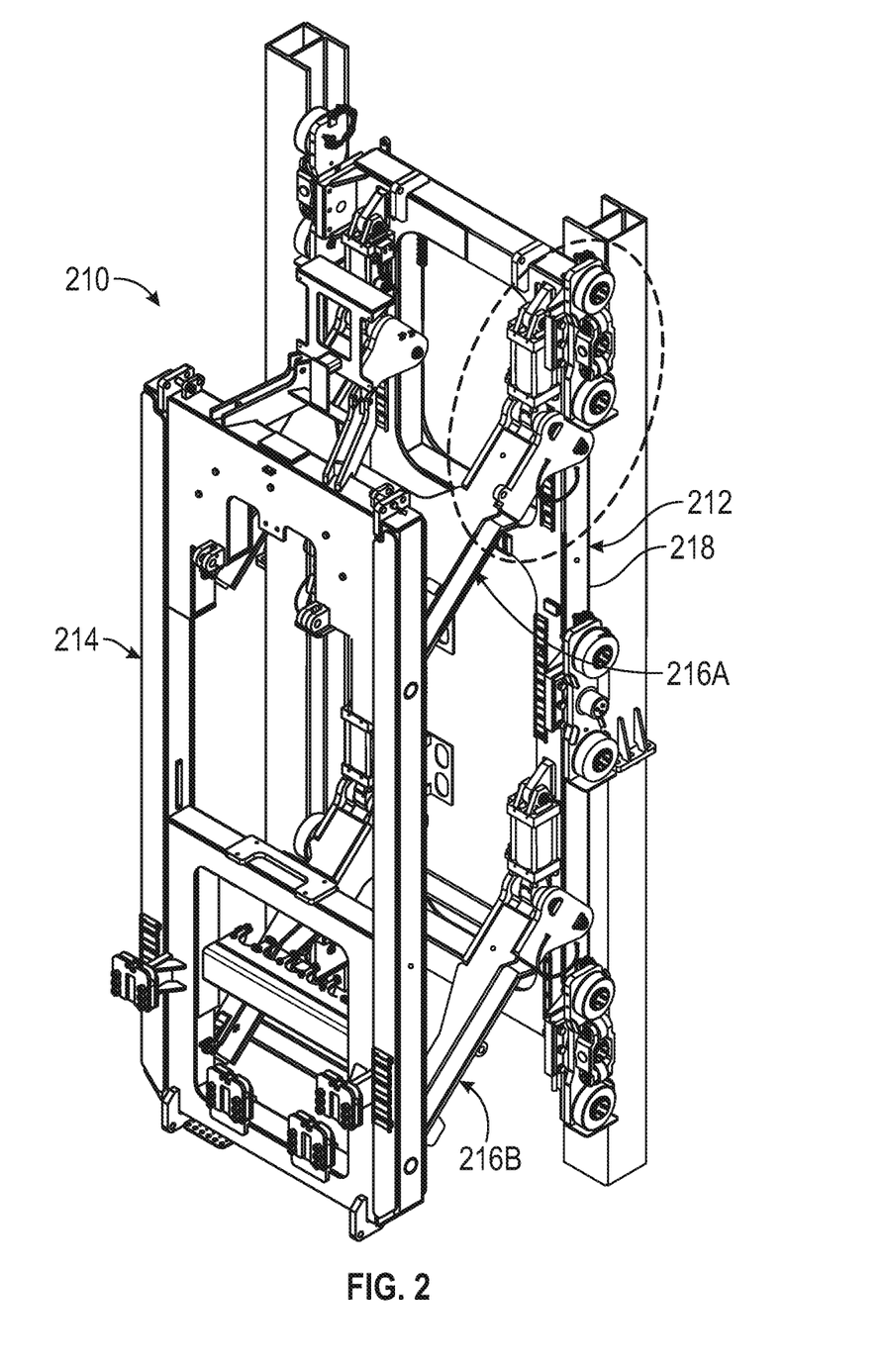
FIG. 2 is a perspective view of a guide dolly assembly equipped with a pressure-based flaw detection system, according to one or more embodiments.

With reference to FIG. 2, a guide dolly assembly 210 for a drill rig top drive is shown. As shown, the guide dolly assembly 210 may include a rail-side portion 212 and a top drive portion 214. The top drive portion 214 may be moveable relative to the rail-side portion 212 via an upper and lower articulating assemblies 216A/B. The articulating assemblies 216A/B may allow the top drive portion 214 of the dolly assembly 210 to swing outward/upward and away from the rail-side portion 212 and return by swinging inward/downward toward the rail-side portion 212. The articulating assemblies 216A/B may include a generally h-shaped element with a top plate, a bottom plate, and a plurality of side plates that form a generally hollow h-shaped element defining a monitor volume. The upper and lower articulating assemblies 216A/B may be relatively heavily loaded structural elements because they control the lateral position of the top drive relative to the rail system. When the top drive is in operation and is handling long pipe strings, the forces experienced by the articulating assemblies may be quite large. Moreover, the repetitive nature of the forces may subject the articulating assemblies to fatigue loading.

Figure 3:
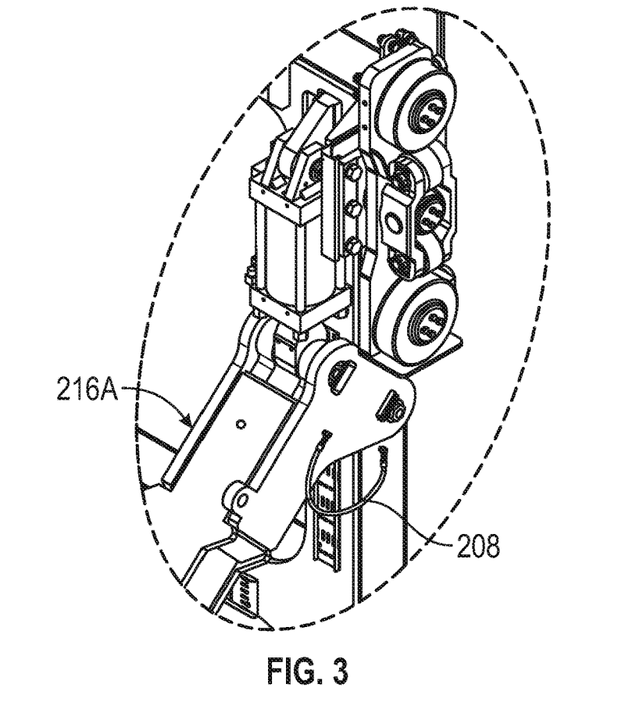
FIG. 3 is a close-up view of a portion of a monitor volume thereof.

Referring now to FIG. 3, a close-up view of the pivoting connection between the upper articulating assembly 216A and the rail-side portion 212 is shown. As shown, the articulating assembly 216A may be secured to the rail-side portion 212 with a relatively large dog ear or plate. The plate may extend from the articulating assembly 216A alongside the rail-side 212 portion and may be pivotally connected to the rail-side portion 212. The dog ear or plate may be welded to the side of the articulating assembly 216A and the welds may seal the monitor volume of the h-shaped assembly from the surrounding atmosphere. That is, the joints (in this case welds) of the dog ear or plate may be in fluid communication with the monitor volume within the articulating assembly 216A.

With reference again to FIG. 2, the rail-side portion 212 of the dolly assembly 210 may also be formed of hollow elements. As shown, the rail-side 212 portion may include vertical roller carriers 218. The vertical roller carriers 218 may have a plurality of rollers mounted thereon for engaging a rail and allowing the dolly assembly 210 to track upward and downward along a rail system. As shown, the vertical roller carriers 218 may be generally tubular elements that may be connected with intersecting tubular elements. In one or more embodiments, the rail-side portion 212, including the roller carriers 218, may include a front plate and a back plate and may have a plurality of side plates forming a control volume within the rail-side portion 212 of the dolly assembly 210.

Figure 4:
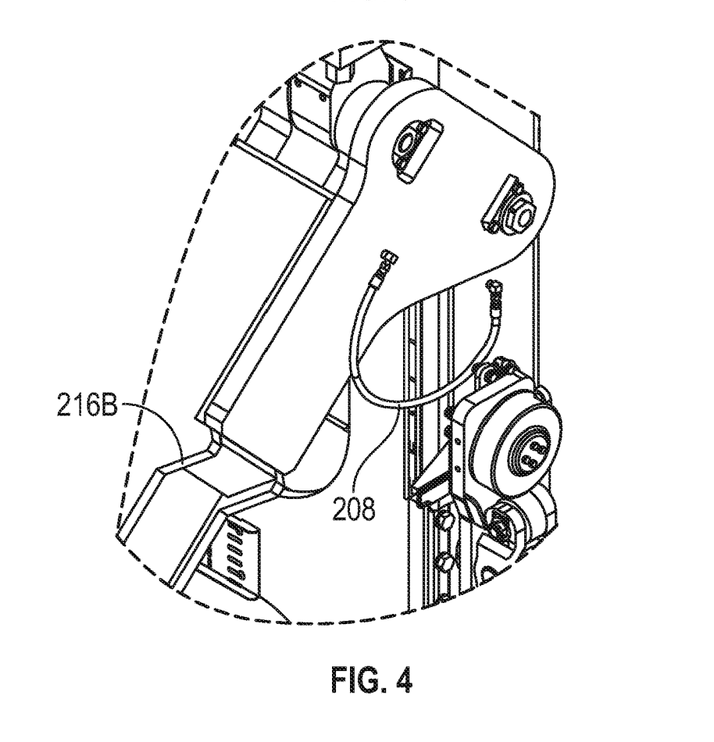
FIG. 4 is a close-up view of a link between separate monitor volumes of the detection system, according to one or more embodiments.

With reference now to FIG. 4, a close-up view of the connection between the lower articulating assembly 216B and the rail-side portion 212 is shown. As shown, a linking conduit 208 may provide a fluid communication between the monitor volume of the articulating assembly 216B and the monitor volume of the rail-side portion 212. The linking conduit 208 may be a flexible gas hose, for example, that is connected to a port or nipple on the articulating assembly 216B and a port or nipple on the rail-side assembly 212. The ports may allow free flow of fluid or gas such that general pressure equilibrium may quickly and naturally occur across the monitor volumes. As shown in FIGS. 2 and 3, a similar linking conduit 208 may be provided between the upper articulating assembly 216A and the rail-side portion 212 causing the three monitor volumes to be in fluid communication with one another.

Figure 5:
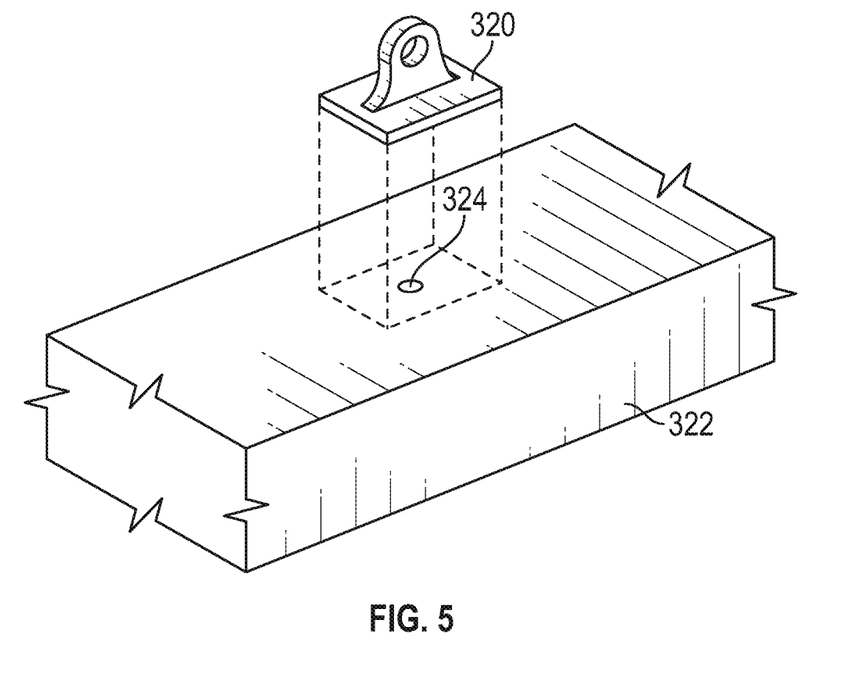
FIG. 5 is an exploded perspective view of a lug or plate connection, according to one or more embodiments.
Figure 6:
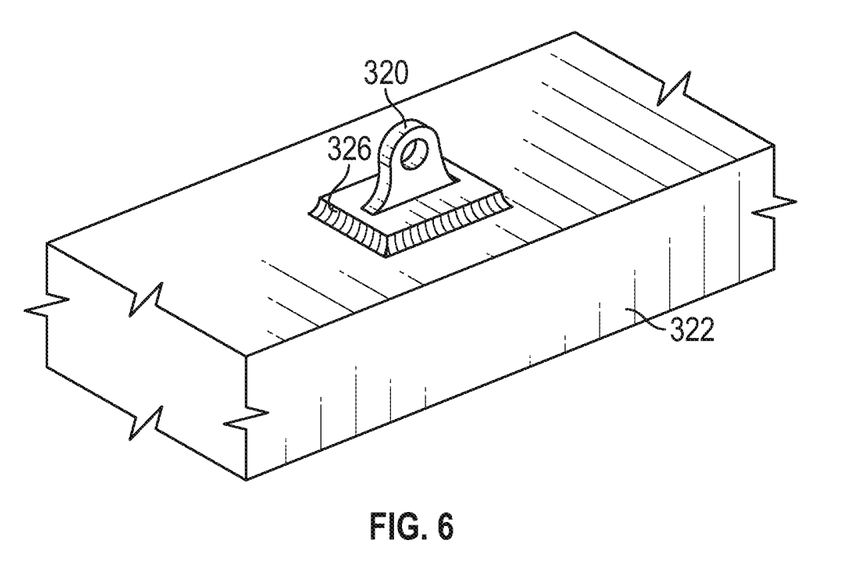
FIG. 6 is an assembled view thereof.

Several different design details are envisaged for creating exposure between welded connections and monitor volumes or between other features that are desired to be monitored and the monitor volume. For example, as shown in FIGS. 5 and 6, a welded lifting lug 320 or other connection may be designed to be in fluid communication with a monitor volume such that the weld 326 securing the lug 320 to the structural member 322 may be monitored. As shown in FIG. 5, a communication hole 324 may be created in the wall of a structural member 322 in a location below, underneath, and/or within the area upon which the lug 320 is to be secured to the structural member 322. As shown in FIG. 6, the lifting lug 320 may be welded to the surface of the structural member 322 with a fully surrounding fillet weld 326, for example. The fillet weld 326 may, thus, separate the monitor volume within the structural member 322 from the atmosphere causing the fillet weld 326 to be subject to monitoring. If a crack, tear, or other defect were to occur in the fillet weld that is sufficient to allow fluid pressure in the monitor volume to equalize, the pressure indication system may trigger an inspection to find the defect before it grows to be too big and/or cause further damage or risk. It is to be appreciated that the flat plate portion of the lug 320 placed against the outer surface of the structural member 322 is not considered as interrupting the fluid communication between the weld and the monitor volume because the contact between these two plates is insufficient to maintain pressure in the monitor volume.

While several examples of joints in the form of welds have been presented, it is to be appreciated that other joints or connections may assist in performing structurally and/or forming the boundary of a monitor volume and may be in fluid communication with the monitor volume. In one or more embodiments, for example, a joint may be formed by a cap plate secured with bolts or screws. In one example, a pipe may terminate with a flange and a gasket and a pipe cap may be bolted to the pipe using bolt holes in the flange. In other embodiments, a cap and gasket may be secured over an opening with bolts that engage tapped holes in the portion of the device with the opening. In other situations, where quality machining of the parts is performed, gaskets may be omitted. Still other types of joints including other welded joints and other bolted connections may be used to form the boundary of a monitor volume and be in fluid communication with the monitor volume.

Figure 7:
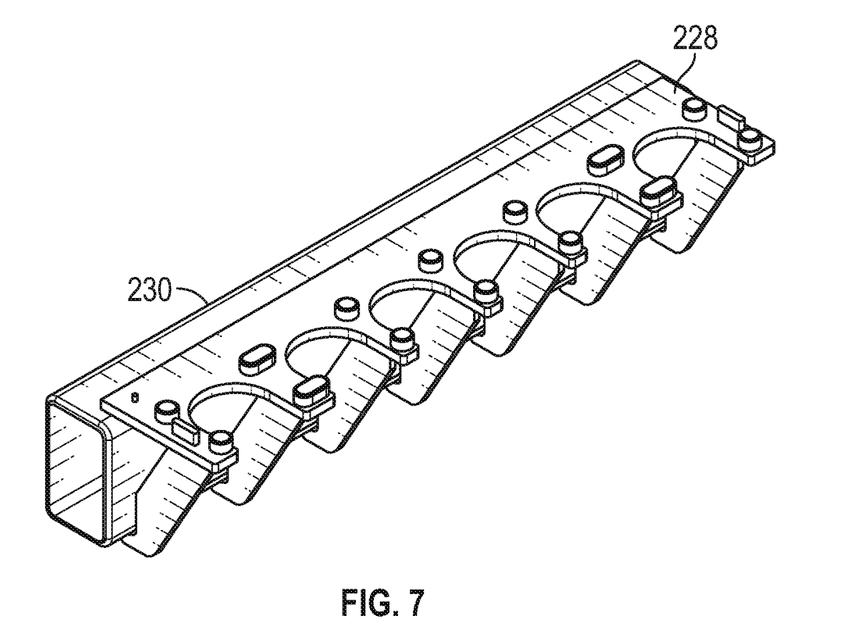
FIG. 7 is a perspective view of a plate connection on the dolly assembly where the plate connection is in communication with a monitor volume, according to one or more embodiments.
Figure 8:
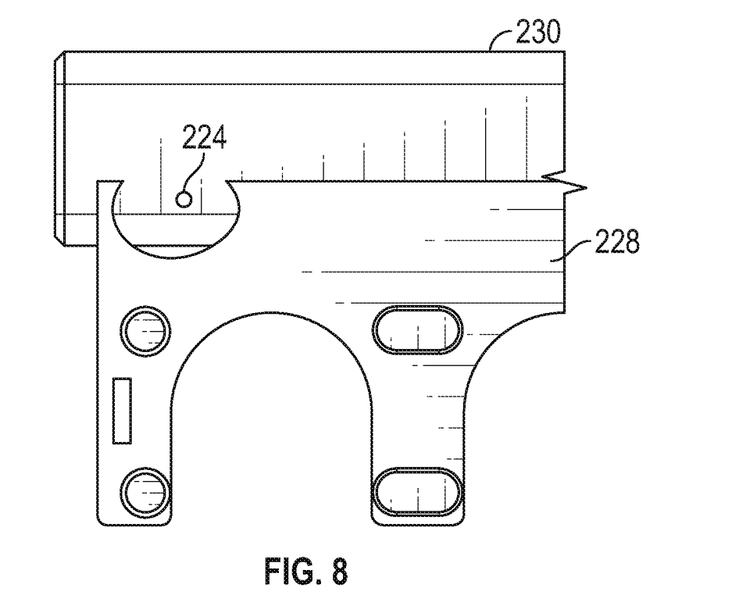
FIG. 8 is a top view of the plate connection of FIG. 7, with a break away portion showing a communication feature.

With reference again to the dolly assembly 210, a more detailed connection between a plate 228 and a structural member 230 is shown in FIGS. 7 and 8. As shown, the plate 228 in this instance may be a much longer plate welded continuously along its edge and ends to the top of the structural member 230 and welded continuously below the plate along the groove created by the radiused corner of the tube 230 and the bottom of the plate 228. In this circumstance, the structural member 230 may have a hole 224 in a top surface thereof within the weld boundary of the plate 228 causing the welds of the plate to the tube to be in fluid communication with the monitor volume of the tube.

Figure 9:
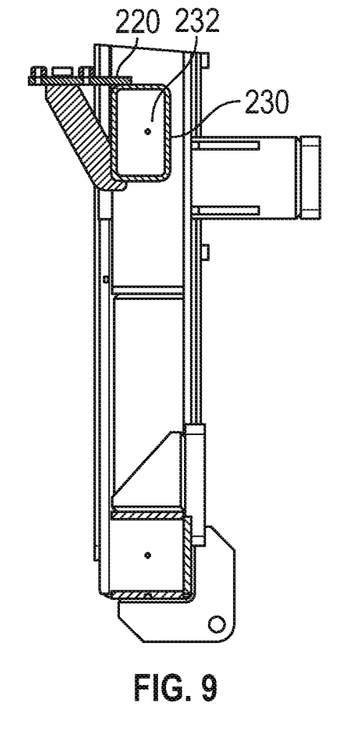
FIG. 9 shows a cross-sectional view of a portion of a frame having communication features between intersecting members of the frame, according to one or more embodiments.

As shown in FIG. 9, multiple structural members may often be connected to one another to form a larger system, device, or weldment, for example. In these weldments, the connections of one element to another may naturally close off a volume within one of the members from the volume within an adjacent and/or connected member. For example, the structural member 230 of FIG. 7 may form a cross member and be welded into the top drive side portion 214 of the dolly assembly 210 shown in FIG. 2. As shown in FIG. 9, pin holes, button holes, worm holes, or other sized holes 232 may be created in the sides of the vertical members of the top drive side frame within the boundary of the connection of the cross member to cause the cross-member monitor volume to be in fluid communication with the monitor volume of the top drive portion of the dolly assembly.

Figure 11:
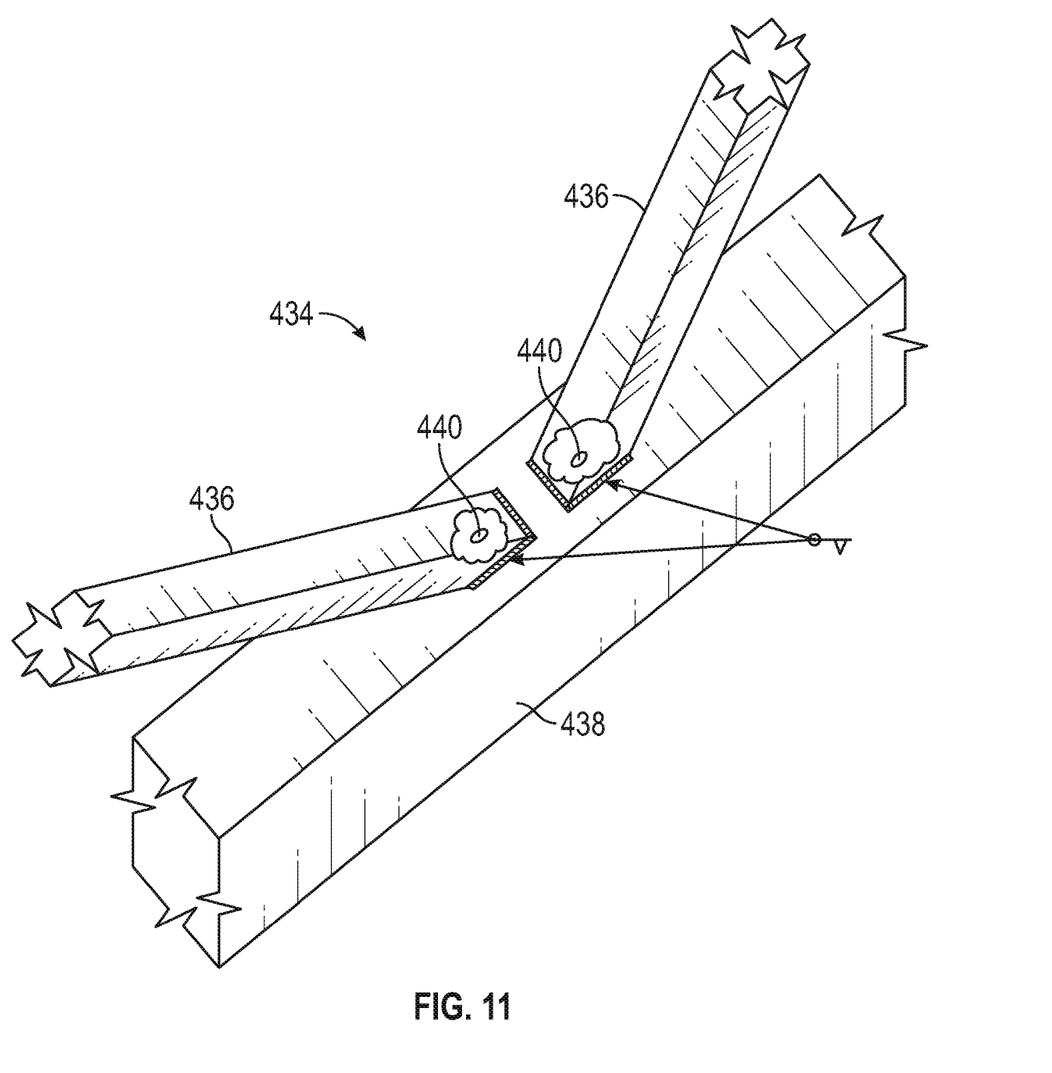
FIG. 11 is a perspective view of a multiple tube connection, according to one or more embodiments.

In one or more embodiments, this approach to creating multiple connected control volumes may apply in many different contexts. As shown in FIG. 11, a relatively common tubular truss connection 434 is shown. As shown, the web members 436 of the truss may frame into a top surface of a bottom chord 438 of the truss, for example. Each of the three members may define their own monitor volumes and holes 440 may be created in the top surface of the bottom chord to place the several monitor volumes in fluid communication with one another allowing them to be monitored with a single pressure sensor in one of the several monitor volumes.

Figure 10A:
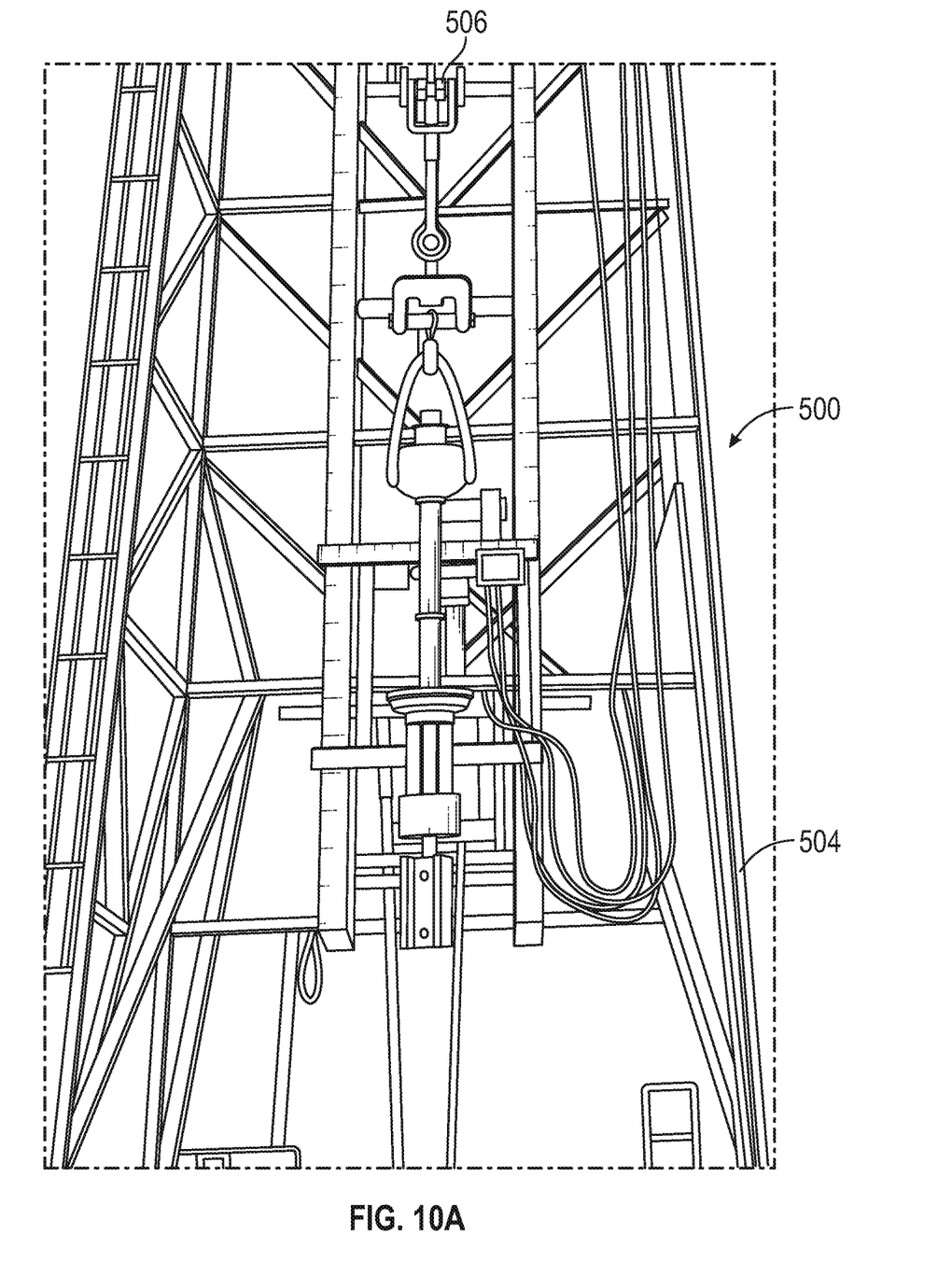
FIG. 10A is a perspective view of a drill rig having a pressure-based flaw detection system.
Figure 10B:
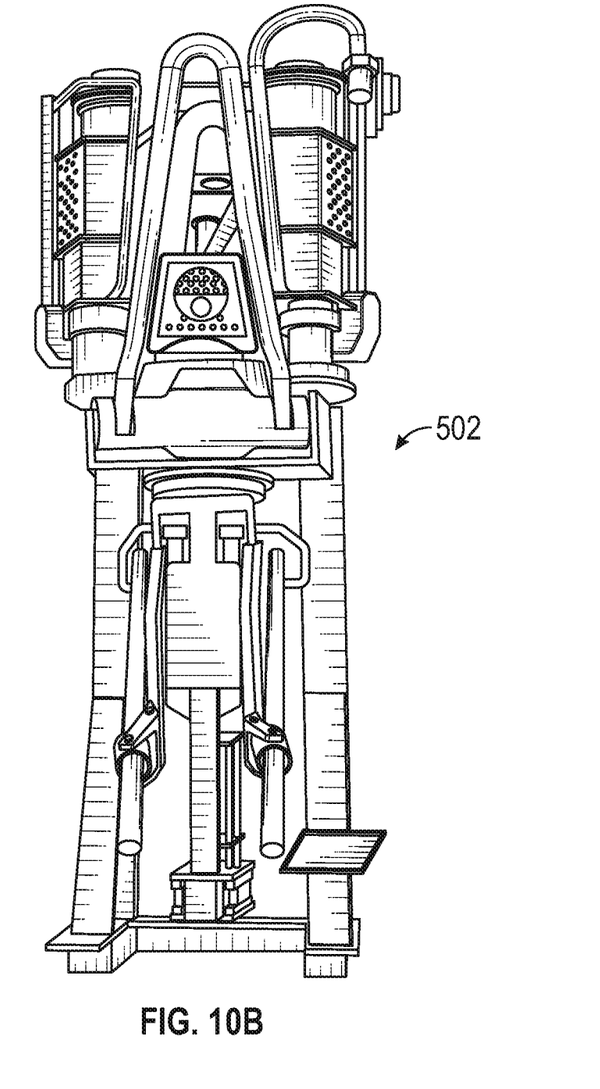
FIG. 10B is a perspective view of a top drive of the drill rig of FIG. 10A.

The present disclosure has discussed the pressure-based flaw detection system in several contexts including weldments, top drive dolly assemblies and the like. The pressure-based flaw detection system can be a system focused on particular aspects of a system or structure and one or more systems of connected monitor volumes may be present within a structure, machine, or piece of equipment. For example, on an oil rig 500, for example as shown in FIG. 10A, a system such as the one described herein may be used for the hardworking components associated with the top drive 502 of FIG. 10B. Another system may be associated with hardworking aspects of the mast 504, for example. Still another system may be associated with the hardworking aspects of the crown block 506 or other components in the load path associated with supporting the drill string. Still other systems may be associated with the wireline drum or other components having the potential to suffer from fatigue loading. Where loading and fatigue are less of a concern, flaw detection systems may be omitted. In any or all of the above cases, the monitor volumes may be dedicated volumes meaning that the containment of pressurized air or a vacuum may be for the sole purpose of monitoring the structural integrity of the system and not for the sake of the contained or held out gas or fluid.

Figure 12:
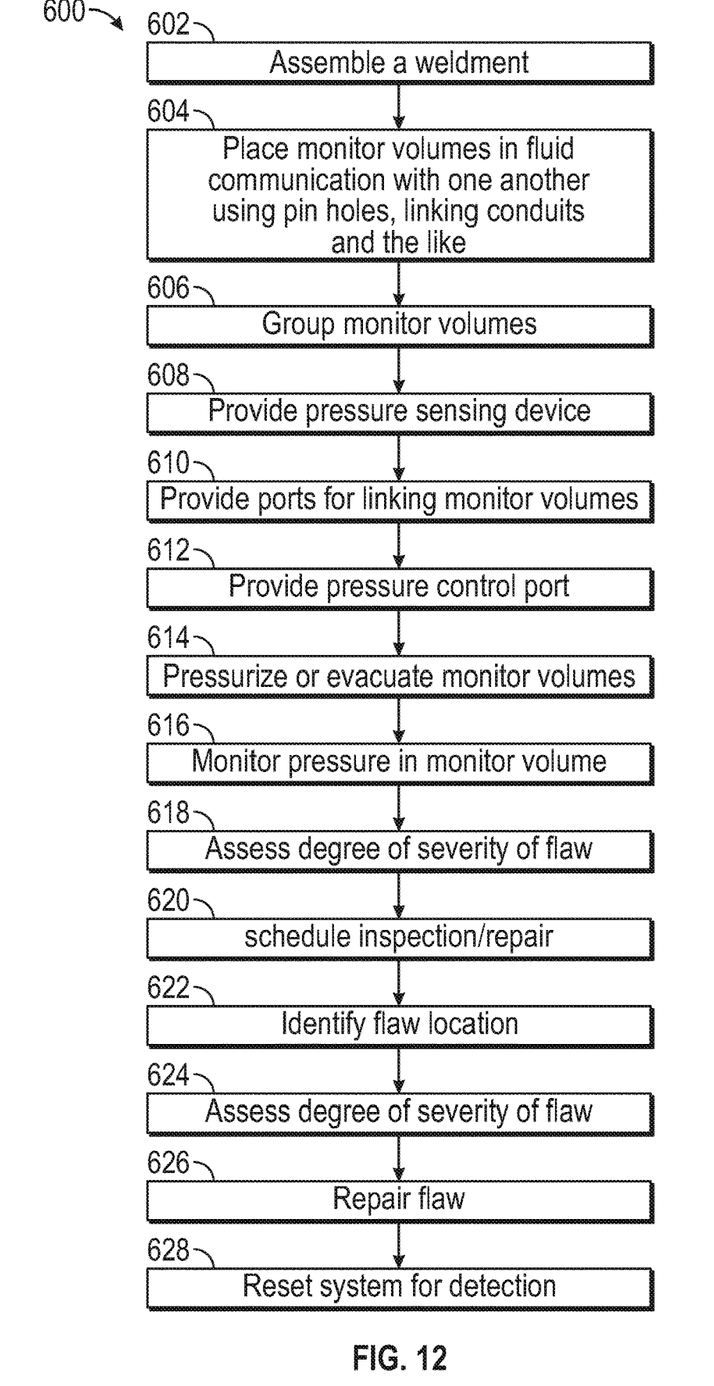
FIG. 12 is a flow chart of a method of flaw detection, according to one or more embodiments.

In one or more embodiments and as shown in FIG. 12, a method 600 of monitoring a system for flaws or defects may include several steps to prepare the system for monitoring, steps for active monitoring, steps for identifying the location of a flaw, steps to repair the flaw, and steps to reset the system. With respect to preparing the system for monitoring, a user and/or a manufacturer may assemble a weldment, a built up system of components, multiple weldments, multiple built up components, a combination of weldments and built up components, or other structures and may create one or more monitor volumes. (602) The monitor volumes may be dedicated to flaw detection and might not relate to the functionality of the device. The monitor volumes may be placed in fluid communication with one another using pin holes, linking conduits, or other techniques discussed herein. (604) Particular monitor volumes may be selected and grouped (606) such that at least one pressure sensor such as a pressure gauge may be placed (608) in or on one of the monitor volumes to assess the pressure of the several volumes. In one or more embodiments, similarly important or critical portions of a device or structure may be grouped together such that a detected flaw in that area can be characterized regarding its level of importance. For example, highly loaded or otherwise critical components may be grouped together, while lesser loaded and/or lesser critical components may be grouped together. This may allow a detected flaw to be characterized as to its level of importance based on which group of monitor volumes it is in. Multiple pressure sensors may be provided to create redundancy and may be used to cross check against each other to avoid interruptions due to faulty sensors, for example. Where multiple unconnected monitor volumes are used, ports may be positioned on at least two of the volumes and a linking conduit may be used to connect the monitor volumes. (610) A port for controlling the fluid within each monitor volume may also be provide such as an air compressor nipple or other element for allowing for attachment of a vacuum or pressurization source. (612) The system may then be pressurized or a vacuum may be created therein. (614) It is to be appreciated that a partial or complete vacuum may be used within the monitor volume such that temperature changes to the system may have a lesser effect on the pressure within the monitor volume, which may help to avoid or reduce false alarms, for example. In one or more embodiments, the vacuum created may include a pressure differential from ambient of 20-30 in Hg. Other levels of vacuum may be provided.

With respect to active monitoring, a user may continually or periodically check the pressure sensor to assure that the pressure in the monitor volume is being maintained. (616) The monitoring may occur during use and, as such, may be an in situ measurement allowing for continued operation of the equipment without interrupting use. In one or more embodiments, a computer system may actively monitor the pressure sensor and may trigger an alert when a change in pressure is detected. A change in pressure in a monitor volume may suggest that a flaw is developing or has developed (i.e., that a crack or tear has occurred such that the pressure in the volume is equalizing with the surrounding atmospheric pressure). In one or more embodiments, where a 20-30 in Hg vacuum was created in the monitor volume, the pressure sensor may be set to trigger an alarm or the user may be trained to act when the pressure differential to ambient drops below 15 in Hg. Still other pressure differentials may be used as a trigger for action. In one or more embodiments, the user may determine the level of importance of the flaw and may make a determination as to the need to interrupt operations. (618) The user may, thus, schedule further inspection and/or repair which may include immediately interrupting operations or scheduling inspection and/or repair at a later time. (620) The scheduling of the inspection/repair may be coordinated with other periodic inspections based on one or more regulations and may allow for satisfying a regulation while also addressing the identified defect.

With respect to identifying a flaw location, the detection of a flaw in a monitor volume may suggest that a crack, tear, warped component, or other defect has developed, but the change in pressure may not precisely identify the location of the defect. Rather, the defect may have occurred at one or more locations along the monitor volume boundary. Accordingly, techniques may be used to identify the location of the defect. (622) These techniques may include visual inspection, pressurization, and/or use of a detectable gas, for example. Visual inspection may involve reviewing the structures, joints, and other features surrounding the monitor volume and looking for visual evidence of a crack, tear, warping, or other defect. Pressurization may involve connecting a pressurize gas source to the pressure control port of the monitor volume and pressurizing the system. Visual and audio inspection may then be used to look for and/or listen for gas escaping from the monitor volume to identify a defect location. In one or more embodiments, pressurization may also include spraying or otherwise coating portions of the monitor volume with water or soapy water and looking for bubble formations on the surface of the monitor volume, which may indicate the location of defect. Use of a detectable gas may involve connecting a pressurized source of a detectable gas to the pressure control port of the monitor volume and pressurizing the monitor volume with the detectable gas. A gas sensing device or sniffer may then be used to look for defect locations on the monitor volume.

If a defect location is identified, steps to repair the defect may be taken. It is to be appreciated that further assessment of the severity of the defect and the severity of its location may be performed to determine if immediate repair is necessary or if the repair may be scheduled for a later time. (624) Repair efforts may include one of several manufacturing, fabrication, or other techniques to repair equipment. (626) In one or more embodiments, particular monitor volumes or pieces of equipment with monitor volumes therein may be replaced. In other embodiments, the repair may involve repairing a weld and, as such, a new weld may be placed over an old weld or the old weld material may be back gouged or otherwise removed and a new weld may be performed. Still other repair techniques may include replacing warped components by unbolting and attaching new components. Still other techniques may include replacing gaskets or otherwise replacing damaged parts. Still other approaches to the repair may be used.

The system may be reset and prepared for further flaw detection by pressurizing the system or evacuating the system. (628) To the extent that linking conduits were removed or disconnected during the repair process, those linking conduits may be replaced to connect the one or more monitor volumes.

While multiple embodiments and aspects of the pressure-based flaw detection system have been shown, nothing in this application should be construed to mean that any particular embodiment is mutually exclusive from another embodiment. Rather, to the contrary, any embodiment or portion thereof should be considered a part of the other embodiments disclosed. For example, the lug connection of FIGS. 6 and 7, may be used in any of the equipment, machines, or systems disclosed. Moreover, and as another example, the truss connections shown in FIG. 11 may be used in any of the equipment, machines, or systems disclosed. Still further, the techniques shown in FIGS. 1-4, 9, and 11 for linking monitor volumes are applicable in any and all machines, weldments, equipment, and/or system.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A flaw detection system, comprising:
   a dedicated monitor volume within a structural component of an articulating assembly, the dedicated monitor volume establishing an air tight space bounded by a weld joint where the weld joint establishes a portion of a boundary of the air tight space and is in fluid communication with the air tight space; and
   a pressure sensing device configured for sensing the pressure in the dedicated monitor volume during operation of the articulating assembly.

2. The flaw detection system of claim 1, wherein the dedicated monitor volume comprises a plurality of monitor volumes each within respective structural components of the system.

3. The flaw detection system of claim 2, wherein the plurality of monitor volumes are in fluid communication with one another.

4. The flaw detection system of claim 3, wherein the fluid communication is provided by a linking conduit connected between two or more of the plurality of monitor volumes.

5. The flaw detection system of claim 3, wherein at least two of the plurality of monitor volumes are in connected structural components and the fluid communication is provided by pin holes placing their respective monitor volumes in fluid communication.

6. The flaw detection system of claim 1, further comprising a connection element comprising a plate arranged on a substantially flat surface, the flat surface comprising a hole arranged within the boundary of the plate, the plate being welded all around to the flat surface.

7. The flaw detection system of claim 1, wherein the dedicated monitor volume has a lower pressure compared to the surrounding atmospheric pressure.

8. The flaw detection system of claim 7, wherein the dedicated monitor volume is substantially a vacuum.

9. The flaw detection system of claim 1, wherein the dedicated monitor volume has a higher pressure compared to the surrounding atmospheric pressure.

* * * * *